United States Patent

[11] 3,566,165

| [72] | Inventor | Thomas E. Lohr<br>Warren, Mich. |
|---|---|---|
| [21] | Appl. No. | 822,163 |
| [22] | Filed | May 6, 1969 |
| [45] | Patented | Feb. 23, 1971 |
| [73] | Assignee | General Motors Corporation<br>Detroit, Mich. |

[54] ELECTRIC VEHICLE DRIVE MOTOR
5 Claims, 2 Drawing Figs.

[52] U.S. Cl. .................................................. 310/67,
105/53, 180/60, 310/75, 310/154, 310/255,
310/268
[51] Int. Cl. .................................................. H02k 7/00
[50] Field of Search ........................................ 310/66, 67,
67.1, 75, 107, 254, 255, 152, 154, 268;
105/52—54, (Inquired); 180/60, 65F, (Inquired)

[56] References Cited
UNITED STATES PATENTS

| 1,747,560 | 2/1930 | Weathers | 310/67 |
|---|---|---|---|
| 2,505,770 | 5/1950 | Hill | 310/67X |
| 3,171,051 | 2/1965 | Burr | 310/268 |
| 3,302,732 | 2/1967 | Beck et al. | 180/65X |
| 3,479,967 | 11/1967 | Crompton | 310/268X |

*Primary Examiner*—Milton O. Hirshfield
*Assistant Examiner*—Mark O. Budd
*Attorneys*—Creighton R. Meland and Robert W. Smith ABSTRACT: An integral vehicle electric drive motor and wheel includes an annular permanent magnet field arrangement which produces an axial airgap field. A disc armature includes layers of flat conductors mounted on both sides of nonconductive discs. The motor shaft is journaled in a support sleeve carried by a vehicle suspension system. The disc armature and a driving flange are rotated by the shaft to drive a conventional vehicle wheel mounted to the driving flange. The motor housing includes a cylindrical casting which supports the field and brush assemblies and aids cooling by radiating heat from integral fins. The ends of the motor are enclosed by annular plates which provide end paths for the axial magnetic field.

PATENTED FEB 23 1971

INVENTOR:
Thomas E. Lohr
BY
Robert W. Smith
ATTORNEY

INVENTOR.
Thomas E. Lohr
BY
Robert W. Smith
ATTORNEY

ELECTRIC VEHICLE DRIVE MOTOR

This invention relates to vehicle electric drive motors and more particularly an axial air gap electric wheel motor having a disc armature and an annular permanent magnet field.

In electrically powered automotive vehicles it is advantageous to provide drive motors which require minimum space and are capable of driving the vehicle wheels through simple mechanical interconnections. One such known arrangement is to mount a vehicle drive motor directly within each vehicle wheel. This avoids complicated and bulky gearing with drive shaft and axle connections. These so-called wheel motors must be rugged, compact, provide adequate cooling, permit easy assembly and disassembly and in some desirable instances be compatible with conventional automotive chassis and wheel arrangements.

The present invention includes a vehicle drive motor arranged to be mounted at a vehicle wheel and having an axial air gap magnetic field produced by a plurality of permanent magnet sectors forming an annular field assembly. The annular field assembly is mounted within a cast aluminum housing which also forms an integral heat sink. A pair of annular magnetic end plates are carried by the housing and are secured to a support sleeve which is connected to a vehicle suspension system. A combined axle and motor shaft is journaled within the support sleeve and carries a disc armature structure. The armature is formed by nonconductive discs carrying patterns of flat conductors on both sides of each armature disc. The armature conductive patterns rotate in the annular air gap space between the annular end members and permanent magnet field. A driving flange is secured to the shaft external to the motor housing. Lug bolts on the driving flange are arranged to receive a conventional vehicle wheel having mounted thereon a typical automotive pneumatic tire. The motor commutator is provided by two groups of brushes which are secured to one of the end plates and arranged to wipe against the armature conductors. One group of the brushes is connected to a source of direct current power to develop current through the armature windings to drive the vehicle wheel while the second group of brushes is connected to a braking circuit which provides regenerative braking action which returns power to the power source or, alternatively, the braking circuit applies an opposing voltage that tends to develop torque that opposes the direction of wheel rotation.

One object of this invention is to provide an axial air gap electric drive motor for a vehicle.

Another object of this invention is to provide an improved direct current electric drive wheel motor which is adapted to be mounted to conventional automotive vehicle suspension systems and to support a conventional automotive wheel.

A further object of this invention is to provide an electric drive wheel motor which includes an integral heat sink housing providing efficient cooling of the motor and end portions which enclose the motor and permit easy assembly and disassembly for servicing and replacement of brushes.

A still further object of this invention is to provide a vehicle drive wheel motor which is compact in an axial direction by avoiding the use of wound wire conductors and includes flat planar conductors which are stacked in at least four layers on two nonconductive discs which form the motor armature and further includes an annular permanent magnet field assembly to produce an axial magnetic flux field across the armature discs.

A still further object of this invention is to provide a vehicle drive wheel motor which includes a disc armature mounted on a common motor shaft and wheel axle in which the armature conductors are supplied current through brushes connected with a source of direct current and a permanent magnet field is provided so that a constant motor field is provided at all times throughout the operation of the drive motor which is unaffected by variations in the output of the vehicle electrical power source.

A still further object of this invention is to provide a vehicle drive wheel motor at each wheel of a vehicle and to provide each motor with two groups of brush sets which permit independent driving and braking operations and also utilize a regenerative braking effect to recharge a battery which supplies the vehicle electrical power.

Further objects and advantages of the present invention will be apparent from the following description, reference being had to the accompanying drawing wherein a preferred embodiment of the present invention is clearly shown.

IN THE DRAWINGS

Figures 1, 1A:
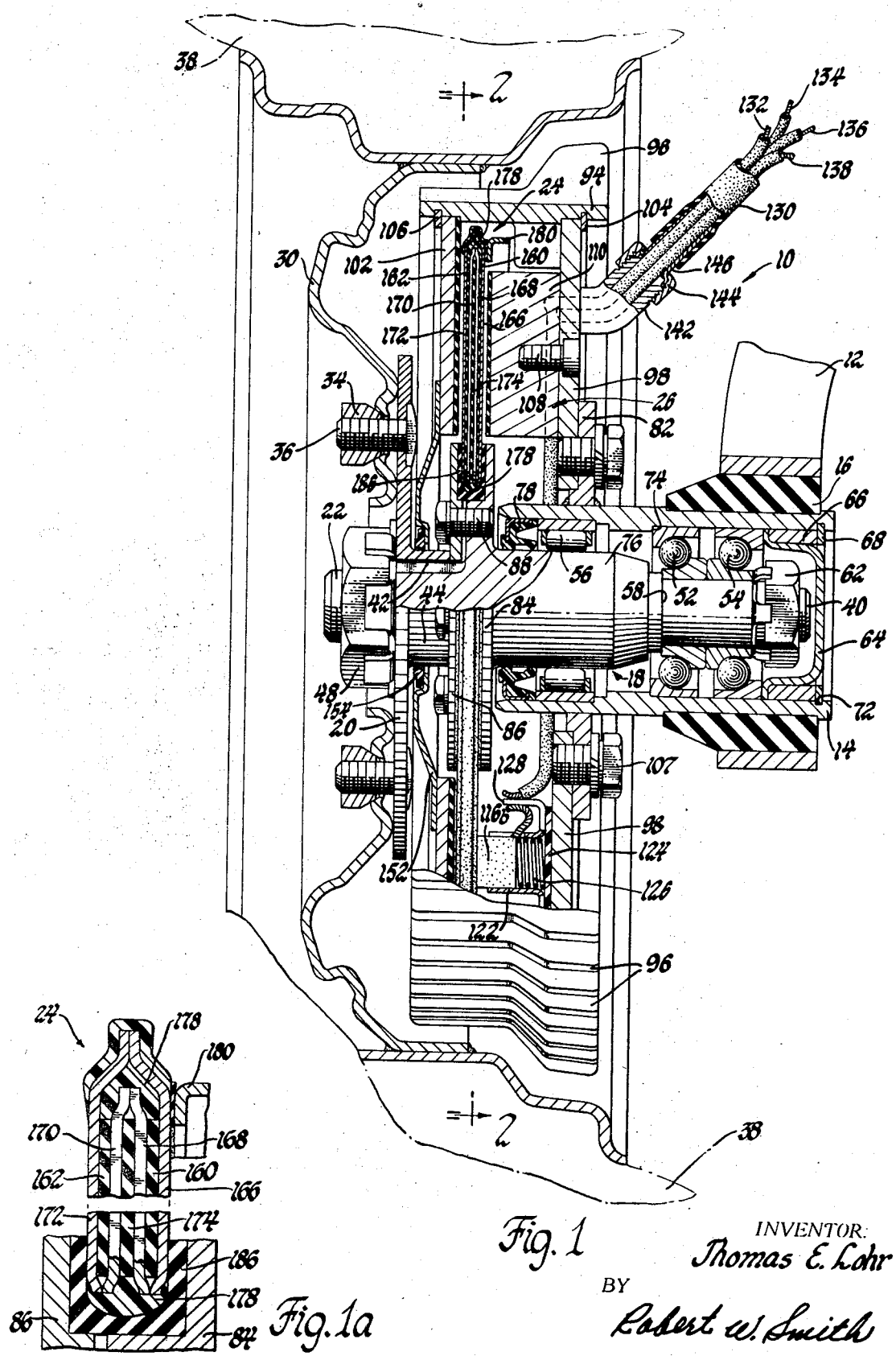
FIG. 1 is a vertical cross-sectional view of the electric vehicle wheel motor of this invention which is shown carried by the suspension system of a vehicle.
FIG. 1a is an enlarged fragmentary view of FIG. 1.

Referring now to the drawings and more particularly to FIG. 1, the electric vehicle wheel motor of this invention, generally designated by numeral 10, is illustrated in a vertical cross-sectional view mounted to a trailing suspension arm 12 of a conventional automotive suspension system. The rearward portion of the wheel motor 10 includes a cylindrical support sleeve 14 secured to the suspension arm 12 by a suitable means including a resilient vibration dampening collar 16 mounted between the sleeve 14 and an opening in the suspension arm 12. A shaft 18 is rotatably mounted within the support sleeve 14 and includes a wheel drive flange 20 secured to the outer end 22 of the shaft 18. A disc armature, generally designated 24, is also carried by shaft 18 with the armature positioned adjacent an annular permanent magnet field assembly, generally designated 26 in FIG. 2.

A conventional vehicle wheel 30 is secured to the drive flange 20 by nuts 34 and threaded studs 36 secured to the flange 20. The wheel 30 carries a conventional pneumatic tire 38, shown in phantom lines, mounted to the wheel 30 in a conventional manner.

The shaft 18, which also forms an axle for wheel 30, is formed of a nonmagnetic stainless steel material. The outer shaft end 22 is threaded as is also the rearward shaft end 40. Splines 42 are provided around the outer shaft end 22 extending rearward of the threaded portion. The drive flange 20 includes an integral hub 44 having internal splines mounted on the spline portion of the outer shaft end. A nut 48 secures the drive flange 20 to the splined end of shaft 18.

The rearward portion of the shaft 18 is rotatably journaled within the cylindrical support sleeve 14 by a pair of ball bearings 52 and 54 and a roller bearing 56. The inner races of ball bearing 52 and 54 are clamped between a shoulder portion 58 of the shaft 18 and a nut 62 applied to the rearward end 40. A hub cap 64 encloses the rearward end of support sleeve 14 and is held in place between the outer race of roller bearing 54 and a sleeve bushing 66 by a snap ring 68. The snap ring 68 resiliently engages a groove 72 provided around the inner periphery of the rearward end of the shaft housing 14. The outer race of ball bearing 52 abuts a shoulder 74 formed by a thickened wall portion of the sleeve 14.

The inner bearing surfaces of roller bearing 56 engage an enlarged shaft portion 76 which has a substantially larger diameter than the rearward shaft end 40. An outer bearing ring of the roller bearing 56 is force fitted into the outer end of the support sleeve 14. A conventional shaft seal 78 encloses the outer end of the sleeve 14 by its metallic casing frictionally engaging the inner surface of the sleeve 14 and the elastomeric lip portion engaging the enlarged shaft portion 76. The shaft seal 78 and the hub cap 64 seal the outer ends of sleeve 14 to prevent loss of lubricating grease and also to seal the internal portion of sleeve 14 from dust and dirt. Also, the support sleeve 14 carries an annular plate 82 which is welded to the outer sleeve surface so as to be integral with the sleeve. The plate 82 supports the motor housing as described more fully hereinbelow.

Extending outside of the outer end of support sleeve 14 the enlarged shaft portion 76 terminates in an integral armature support flange 84. The armature support flange 84 extends along the shaft 18 between the outer end of sleeve 14 and the end of the splined portion of the outer shaft end 22. An annular clamping plate 86 mates with the support flange 84 to form an annular recess for receiving the disc armature 24. The annular plate 86 fits over the splines of end 22 and is fastened to the flange 84 by means of bolts 88 applied to threaded holes provided in the flange 84.

Referring now more particularly to the motor armature, field and housing assemblies, the housing 94 includes a cylindrical aluminum casting. The aluminum housing 94 includes radially extending fins 96 around its outer periphery which aid dissipation of heat developed within the motor. The inner surface of housing 94 supports a rearward annular end plate 98 and an outer annular end plate 102. The end plates 98 and 102 are held against annular shoulder portions within the housing by snap rings 104 and 106. The snap ring 104 and 106 resiliently engage internal grooves provided in the inner surface of the housing 94. The end plates 98 and 102 are made of a magnetic material such as soft iron to form a portion of the motor magnetic field structure. The rearward end plate 98 is secured to the support plate 82 by bolts 107 which are applied to threaded holes in the end plate 98.

Figure 2:
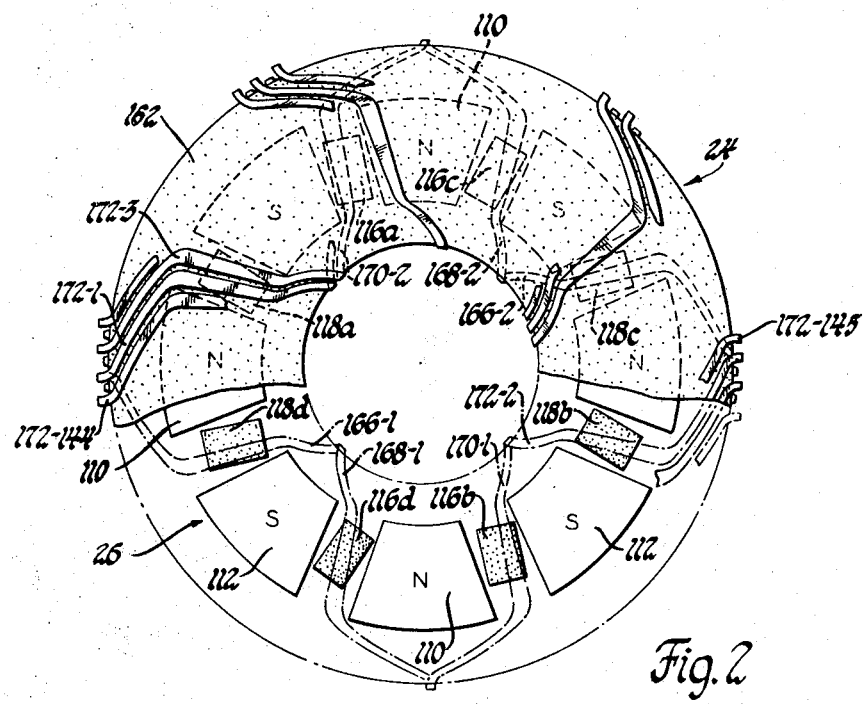
FIG. 2 is a cross-sectional view taken along the line indicated by arrows 2—2 in FIG. 1, illustrating the armature, annular permanent magnet field poles and brush arrangement of the wheel motor of this invention.

The inner face of the end plate 98 supports the permanent magnet field assembly 26. The permanent magnet field assembly 26 includes eight permanently magnetized pole pieces 110 and 112. Each pole piece includes a permanent magnet sector which is supported on the end plate 98 by means of bolts 108. The permanent magnet sectors are arranged, as illustrated in FIG. 2, in circumferentially spaced apart relationship with alternately opposite polarities to form an eight pole annular field assembly. The permanent magnet sectors are formed from ferrite magnetic material having a low permeability and high coercivity.

FIG. 2 is a sectional view of FIG. 1 looking in the direction of arrows 2—2 with part of the wheel parts removed to more clearly illustrate the relationship of the magnetic field poles 110 and 112, the armature conductors and the motor brushes designated respectively, 116a, 116b, 116c, 116d and 118a, 118b, 118c and 118d. The brushes may be a sintered composition of copper and graphite. The first group of brushes 116a through 116d are designated driving brushes and the second group of brushes 118a through 118d are braking brushes as explained more fully in connection with the schematic circuit diagram of FIG. 3. The brush assemblies are spaced 45° apart between the eight spaced apart permanent magnet sectors 110 and 112 and on the inner face of rearward end plate 98.

A single brush holder assembly 122, which is substantially identical to the other brush holder assemblies, is illustrated in FIG. 1 supporting the brush 116b. The brush holder 122 is formed of a conductive sheet metal material mounted to the end plate 98 and insulated from it by a layer of insulating adhesive material 124. The brush 116b is biased against the rearward face of the disc armature 24 by a coil spring 126 provided within each brush holder. The brush shunt wire is connected to a tab terminal 128 formed integrally with the brush holder assembly.

External motor connections are provided by a cable 130 having lead wire conductors 132, 134, 136 and 138. The motor lead wires are attached to the brush holder terminals 128. The cable 130 extends into the motor housing at a nipple 142 which is mounted to an opening in the end plate 98. The nipple 142 includes an end cap 144 having a central opening and internal threaded portion mating with external threads provided on the end of the nipple 142. The cable conductors extend through the top of the cap 144 and sleeve bushing 146 which is slipped inside of the cable insulating sheath. Flared ends of the sleeve bushing 146 are clamped against the end of nipple 142 by cap 144 to seal the conductor opening of the rearward end plate. The lead wire conductors 132, 134, 136 and 138 are cemented to the end plate 98 by a suitable adhesive so that the wires will not come loose due to vibration or centrifugal forces.

The outer end plate 102 includes an annular cover piece 152 which encloses the opening between the end plate and the hub of the drive flange 20. The cover 152 is welded along its outer edge to the end plate 102 and terminates in an inner recessed lip portion carrying a conventional shaft seal 154. The shaft seal 154 frictionally engages the recessed lip of cover 152 and the elastomeric lip portion resiliently engages the outer surface of drive flange hub 44. The end plates 98 and 102 and cover piece 152 enclose the motor housing and seal the internal motor structure from dust and moisture. Access to the motor brushes is provided by removing the wheel 30, nut 48, drive flange 20, outer end plate 102 and then dismounting bolts 88, the plate 86 and the disc armature 24.

The disc armature 24, shown in the cross-sectional views of FIGS. 1 and 1a, includes nonconductive discs 160 and 162, respectively, made of an insulating phenolic or plastic material and preferably of Mylar which is manufactured by the E.I. duPont de Nemours & Company, Inc. Conductive metal patterns 166, 168, 170 and 172 of flat or planar conductors are respectively mounted by means of an adhesive or lacquer on each side of the discs 160 and 162. An insulation layer 174 consisting of a solid insulation sheet or a suitable insulating adhesive is placed between the inner side faces of the discs. The flat conductor patterns 166, 168, 170 and 172 are stamped from a sheet of conductive material such as copper having a thickness of between 0.043 and 0.055 inch. The patterns consist of flat half-wave coil segments which are interconnected at the outer and inner disc edges to form wave shaped coil turns of the type utilized in disc and printed circuit type motors. In one preferred embodiment each conductive pattern includes one hundred forty-five half-wave conductor segments.

The fragmentary cross-sectional view of the disc armature 24 is shown in FIG. 1a which illustrates the conductor segments of each disc extending beyond the outer and inner boundaries of the insulated discs. The conductor segments of pattern 166 on the outer side of disc 160 are crimped and welded to the outer conductor segments of pattern 172 at the outer disc boundary where also the conductor segments of patterns 168 and 170 on the inner sides of discs 160 and 162 are respectively welded together. At the inner disc boundary, the conductor segments of patterns 166 and 168 and the conductor segments of patterns 170 and 172 are respectively welded together. After the welded connections of the armature conductors are made at the inner and outer disc boundaries, both inner and outer peripheral edges are sealed in a plastic molding material 178. Accordingly, the end connections are insulated and sealed to protect the conductor ends from being separated.

Conductor loop regions are formed by the armature conductors in which each loop encompasses substantially all of the magnetic field of a given permanent magnet pole piece. In FIG. 2 there is a partial illustration of the arrangement of the conductor segments which form a series armature conductor path around the disc armature 24. Each coil half-wave segment is welded to another segment that has an active armature conductor portion arcuately displaced by approximately the field width of a magnetic pole. The armature path is formed, for example, beginning with a conductor segment, indicated as 172-1 of pattern 172 on the outside of insulated disc 162. The path extends to a half-wave segment 166-1 of pattern 166, illustrated in phantom lines, which is mounted on the outer side of insulated disc 160, to segment 166-1 connected at the inner disc boundary to the conductor segment 168-1 of pattern 168 which is connected at the outer disc boundary to a conductor segment 170-1 of pattern 170. Conductor segment 170-1 is connected at the inner disc boundary to a second segment 172-2 of pattern 172. The path continues as just described through conductors 166-2, 168-2, 170-2 to a third conductor segment 172-3 of pattern 172 which is adjacent the beginning conductor segment 172-1. The loop connections similarly continue around the armature disc so that the wave-shaped coil turns are connected in series. The armature path is completed by the conductor segments 172-144 and 172-145, respectively, adjacent to the conductor segments 172-1 and 172-2 and the armature path will again repeat at segment 172-1.

Increased rigidity of the disc armature 24 is provided by a stiffener ring 180 cemented over the conductive pattern 166 of disc 160, as shown in FIG. 1a The stiffener ring 180 is cemented by an insulating adhesive so that the ring is electrically insulated from the conductor segments of pattern 166. To insulate the armature conductors from the sides of the groove formed by plate 86 and flange 84 the groove is lined with a thin layer of insulating material 186. Also, thin coatings of insulating material are applied to the faces of permanent magnet pole pieces 110 and 112 and to the internal side of end plate 102 to prevent electrical contact with the armature conductors.

With the armature 24 secured to the flange 84, the armature conductor segments are rotatable past the alternate magnetic polar fields developed by the groups of pole pieces 110 and 112. The magnetic fields extend axially across the annular air gap space between the pole piece faces adjacent the disc armature 24 and the outer annular end plate 102. The magnetic fields alternate in polarity around the annular air gap space with closed loop magnetic flux paths being formed between the axial magnetic fields by flux fields passing through the outer end plate 102 and the rearward end plate 98.

Figure 3:
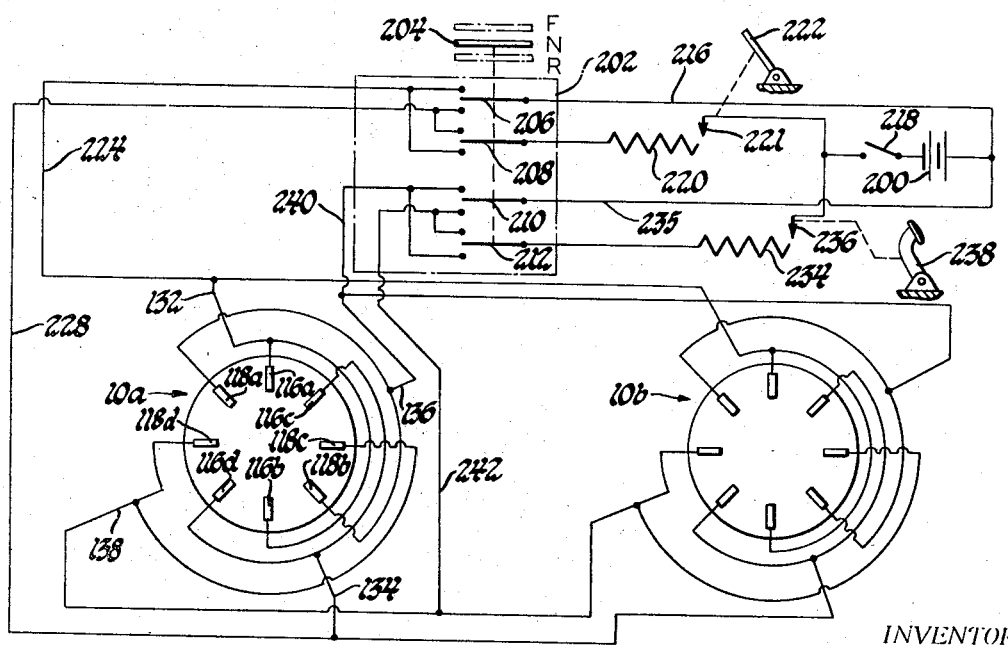
FIG. 3 is a schematic circuit diagram of the control circuit for a pair of the motors illustrated in FIG. 1 which form two rear drive wheels of a vehicle.

Referring now to the electric schematic diagram of FIG. 3, a pair of wheel motors generally designated 10a and 10b are illustrated wherein each corresponds to the wheel motor of this invention which has been described hereinabove in connection with FIGS. 1, 1a and 2. These wheel motors are mounted, for example, in the rear wheels of a vehicle although a plurality of such wheel motors could be used at each wheel of a vehicle. The wheel motors are supplied from an electrical power source consisting of a battery 200 which provides a direct current source. Alternatively, the electrical source can include a fuel cell, dynamoelectric machine or other known source of direct current.

The battery 200 is connected to a drive selector switch 202 which reverses the polarity of the connections between the battery and the wheel motors 10a and 10b. The switch handle 204 of the switch 202 has upper and lower positions, shown in phantom lines, for forward and reverse driving, respectively, and the illustrated middle position corresponds to a neutral or non driving position. The drive selector switch 202 consists of four sets of single pole, double throw switches 206, 208, 210 and 212 each including switch arms mechanically linked together and to handle 204. Each switch arm makes connection to an upper or a lower contact when the switch arms are respectively placed in the forward or reverse driving positions. A conductor 216 connects a first pole, for example the positive terminal, of the battery 200 to the switch arm of switch 206. A system on-off switch is connected in series with the negative pole of battery 200. The fixed end of a speed control rheostat 220 is connected to the switch arm of switch 208. The slider tap 221 of the rheostat 220 is connected in series with the on-off switch 218 and is mechanically linked to an accelerator control foot pedal 222. The pedal is arranged to normally bias slider 221 in an off position. The upper and lower contacts respectively of switches 206 and 208 are connected together and to conductor 224 which is connected through lead wire 132 to the driving brushes 116a and 116b of each drive motor. The other two driving brushes 116c and 116d of each wheel motor are connected by motor lead wire 134 to conductor 228 and to both the lower contact of switch 206 and upper contact of switch 208.

A braking circuit is connected between the battery 200 and the braking brushes 118a-118b and 118c-118d which includes a braking rheostat 234 and the switches 210 and 212 of the selector switch 202. The switch arm of switch 210 is connected to the positive pole of battery 200 by conductor 235 and the switch arm of switch 212 is connected to the fixed end of the braking rheostat 234. The slider arm 236 of rheostat 234 is connected to the on-off switch 218 and to the negative pole of battery 200. The movable slider arm 236 is operated by a mechanical linkage connected to a foot actuated brake pedal 238. The rheostat 234 is arranged so that the slider arm is normally held in an open position and current is applied through the braking circuit when the pedal 238 is depressed.

The respective upper and lower contacts of switches 210 and 212 are connected together and to conductor 240 which is connected to the motor lead 136 connected with the braking brushes 118a and 118b. The respective lower and upper contacts of switches 210 and 212 are connected to the conductor 242, wire lead 138 and to the braking brushes 118c and 118d.

In operation, the axial air gap flux fields produced by the groups of permanent magnet pole pieces 110 and 112 traverse the armature conductor segments. The motor commutation is provided by the brushes wiping the conductor segments of pattern 166 so that the armature current is applied directly to the armature conductor segments. The permanent magnet field is constant and accordingly does not vary with changes in the armature current or fluctuations in battery current. The motors 10a and 10b are driven in the forward direction when the drive selector switch handle 204 is in the upper position, the on-off switch 218 is closed, and foot pedal 222 is depressed. The positive pole of the battery 200 is connected to the brushes 116a and 116b and the negative a of the battery is connected to brushes 116c and 116a to develop forward driving torque at the wheel motors 10a and 10b. Decreasing the resistance of the rheostat 220 by depressing the foot pedal 222 increases the voltage across the driving brushes to increase armature current and the torque developed at wheel motors 10a and 10b.

The motor brushes apply battery voltage across the armature conductors at locations corresponding to the commutation neutral axes which are between the field poles. The use of groups of four brushes rather than two in the respective driving and braking circuits allows a larger value of current to be applied to the armature since the contact area and therefore the current capacity of each brush is limited by the width of the armature conductor segments. The armature current flows between the positive and negative polarity brushes through the interconnected progressively wave-wound armature conductors such that the direction of current through the armature segments is in the proper torque producing relationship relative to the magnetic field poles. This is provided by the respectively oppositely poled driving brushes being spaced 45° degrees apart and wiping the wave-wound conductor segments so that the armature current is commutated relative to the eight field poles as the disc rotates, in a manner known in the art of printed circuit motors. Torque on the motor armature is developed by reaction of the motor fields and the current flow through the armature conductors and is transmitted through the armature support flange 84 and plate 86 to rotate the shaft 18 within the support sleeve 14. Accordingly, the drive flange 20 at the end of shaft 18 is driven to rotate the vehicle wheel 30.

The motors 10a and 10b are reversed to drive the vehicle rearward when the drive selector switch handle 204 is placed in the lower position so that the conductors 224 and 228 are connected through the selector switch 202 to battery 200 in opposite polarities from that provided when the handle 204 is in the upper position. Accordingly, the armature rotates in the reverse direction.

In the operation of the motor braking circuit arrangement, when the brake pedal 238 is depressed and the motors 10a and 10b are being driven forward, braking or reverse voltage is applied to the armature from braking brushes 118a-118b and 118c-118d so as to oppose the torque producing effect of the forward driving voltage developed at brushes 116a-116b and 116c-116d. The torque is decreased to thereby retard rotation of the wheel. Depending upon the respective positions of the foot pedal 222 and the brake pedal 238 and correspondingly the value of the resistances provided by rheostats 220 and 234, the amount of resultant torque is determined by the difference of the opposing driving and braking voltages.

For fastest braking, the accelerator foot pedal 222 is released to interrupt the current applied through the motor driving brushes 116a through 116d and the brake pedal 238 is depressed so that a voltage which is reverse to the driving voltage is applied through the group of braking brushes 118a through 118d. This braking voltage aids the opposing torque which is developed by the motor counter electromotive force voltages and opposes the armature rotation. In the latter instance, a motor plugging action is provided by voltage being applied to the armature that tends to reverse and thereby stop the forward motor rotation.

At high speeds with only the accelerator pedal depressed, the counter e.m.f. generated in the armature conductors may exceed the battery terminal voltage and a regenerative braking action occurs in which case the motor counter e.m.f. voltage is applied across the rheostat 220 and the battery terminals to provide a battery charging current. A suitable regulator which does not form a part of this invention may be connected to the battery which is operative to prevent overcharging of the battery during the regenerative braking action. The degree of regenerative braking action is determined by the wheel speed and resistance of the rheostat 220 which changes as the pedal is depressed. Some resistance loading is provided by the rheostat 220 so that it appears as a dynamic braking load during the regenerative braking mode of operation. Corresponding braking operations are provided when the switch 202 is in a reverse driving position.

Accordingly, there is provided a choice in the braking modes of motors 10a and 10b so that braking is controlled at varying speed and load conditions of the motors by operation of the brake pedal alone or in combination with the accelerator control pedal. As noted above, the motor can be connected to the battery simultaneously through both the speed control rheostat and the braking rheostat to maintain a desired torque on the shaft 18. In a standing condition on a hill or incline, for example, torque can be maintained by depressing both of the accelerator and brake pedals to hold the vehicle stationary.

It is contemplated that a mechanical braking system will normally be included in the motor wheel structure shown in FIG. 1. For example, a brake disc can be connected to a rotating part of wheel such as the end 40 of the shaft 18. The shaft would extend through the cap 64 and the disc would be mounted beyond the end of sleeve 14. The mechanical braking system can be mechanically linked to the brake pedal 238 so that both mechanical and electrical braking systems are operated by the brake pedal. Also, the wheel motor 10 can be used without the braking brushes 118a through 118d in which case braking is provided by mechanical brakes alone or in combination with an electrical braking arrangement connected to the driving brushes 116a through 116d.

The motor of my invention, by reason of using the particular arrangement of an annular permanent magnet field assembly and a disc type armature, provides a compact wheel motor structure capable of delivering a high horsepower output at each wheel of the vehicle. It is possible to apply high levels of armature current through the motor armature by using a plurality of discs having patterns of flat conductors mounted thereon. The motor housing forms an integral heat sink which radiates heat generated within the motor at higher armature current levels when the torque output of the motor is increased. The groups of driving and braking brushes provide flexibility in arranging the motor driving and braking circuits to increase the flexibility of controls which can be used in combination with the wheel motor of my invention. The brushes and armature are made accessible by simple removal of the wheel and outer motor parts. Also, the vehicle wheel may be readily removed for servicing the tire without disturbing the motor.

While the embodiment of the present invention as herein disclosed constitutes a preferred form it is to be understood that other forms may be adopted.

I claim:

1. An electrically powered wheel for a vehicle comprising: a nonrotatable sleeve adapted to be secured to a vehicle suspension; a shaft journaled for rotation within said sleeve; an electric motor having a field assembly, said field assembly including an annular permanent magnet assembly including means providing a plurality of magnetic pole faces, said permanent magnet assembly extending radially of said sleeve and nonrotatably secured thereto; an annular part formed of magnetic material axially spaced from said permanent magnet assembly to form an annular axially extending space located therebetween; means securing said annular part to said permanent magnet assembly whereby said annular part and permanent magnet assembly are nonrotatably secured to said sleeve; an armature for said motor, said armature comprising a disc of insulating material carrying armature conductor means; a radially extending flange formed integral with said shaft; means for clamping an inner portion of said armature between said flange and an annular clamping means to provide a driving connection between said armature and said shaft, the outer portion of said armature positioned in said axially extending space; a wheel drive member secured to said shaft, said wheel drive member including means for carrying and driving a vehicle wheel whereby said shaft forms an axle for a vehicle wheel and an output shaft for said motor; a first and a second pair of motor brushes engaging said armature conductor means; means supporting said first pair of motor brushes adjacent said armature conductor means and relative to said field pole faces to apply voltage across said armature conductor means which is effective to drive said wheel motor shaft in a given direction of rotation; means supporting said second pair of motor brushes adjacent said armature conductor means and relative to said field pole faces to apply a voltage across said armature conductor means which is effective to oppose the rotation of said motor shaft whereby the speed of a vehicle wheel connected to said wheel motor increased by applying increasing voltage across said first pair of motor brushes and the speed is decreased by applying increasing voltage to said second pair of motor brushes.

2. An axial air gap electric wheel motor comprising: a cylindrical motor housing formed of a nonmagnetic metal, said housing including end portions formed by first and second annular end plates made of a magnetic material; an annular field assembly secured to said first annular end plate including a plurality of permanently magnetized poles, said magnetized poles being of alternate opposite polarities which produce oppositely directed magnetic flux regions across an annular axial air gap space between said end plates; a cylindrical support sleeve for mounting said wheel motor to a vehicle suspension system and supporting one of said first and second end plates; a shaft journaled within said cylindrical support sleeve, said shaft including an outer end having a driving flange for supporting a vehicle wheel and a portion intermediate the shaft ends including an armature support flange extending radially toward said annular air gap space between said first and second end plates; a disc armature including plural discs of insulating material having flat conductor segments secured on both sides of each of said discs said flat conductor segments being connected together to form an armature winding; means for clamping said disc armature to said armature support flange of said shaft so that said flat conductor segments are arranged for rotation within said annular air gap space including said magnetic field flux regions; plural brush elements circumferentially spaced apart and carried by one of said first and second annular end plates, said brush elements being spring biased into contact with the flat conductors carried by one of said nonconductive armature discs said brush elements being operative to conduct current to said armature winding in a given direction whereby torque is developed on the disc armature to rotate said shaft and said wheel driving flange of said shaft.

3. An axial air gap electric wheel motor comprising: a cylindrical motor housing formed of a nonmagnetic metal, said housing including an inner surface and an outer surface having integral fins extending radially outward to radiate heat to the ambient air surrounding said housing; motor end portions including first and second annular end plates formed of a magnetic material and carried in an axially spaced apart relationship by said inner surface of said housing; an annular field assembly formed by a plurality of circumferentially spaced permanent magnet pole sectors secured to said first annular end plate, said pole sectors having pole faces of alternate polarities which produce oppositely directed magnet flux regions across an air gap space between said pole faces and said second annular end plate; a cylindrical support sleeve for mounting said wheel motor to a vehicle suspension system and including means for securing said first end plate intermediate the ends of said support sleeve; a shaft including a first end journaled within said cylindrical support sleeve and a second end extending outside of said second end plate, said second shaft end including a driving flange for receiving a vehicle wheel and a portion intermediate shaft ends including an armature support flange extending radially within the air gap space between said first and second end plates; an annular disc armature having flat conductors secured on both sides thereof; said flat conductors including connecting portions extending beyond the inner and outer boundaries of said annular disc armature in overlapping relationship; means connecting said conductor connecting portions together to form an armature circuit having wave shaped conductive paths; means including an insulating material sealing the overlapping connecting portions around the inner and outer disc boundaries; means for clamping said disc armature to said armature support flange of said shaft whereby the disc is rotatable within said magnetic field flux regions in said air gap space; and plural brushes each mounted on said first annular end plate between said permanent magnet sectors, said brushes making wiping contact with the flat conductors carried on one side of said disc armature to commutate current flow through said armature circuit when said brushes are connected to a source of electrical current.

4. An axial air gap electric wheel motor comprising: a cylindrical motor housing formed of a nonmagnetic metal including an inner cylindrical surface; motor end portions including first and second annular end plates formed of a magnetic material and carried in an axially spaced apart relationship by said inner surface of said housing; an annular field assembly formed by a plurality of circumferentially spaced permanently magnetized pole sectors secured to said first annular end plate, said pole sectors providing magnetized pole faces of alternating polarities which produce oppositely directed magnetic flux regions across an annular air gap space between said pole faces and said second end plate; a shaft including a first end extending through the annular portion of said first annular end plate and the second end extending through the annular portion of said second annular end plate; a wheel drive means connected to said second shaft end for supporting and driving a vehicle wheel, an armature for said motor, said armature including a disc of insulating material carrying armature conductors extending radially on both sides thereof; means for mounting said armature to said shaft whereby said armature conductors extend into said annular air gap space; a plurality of brushes engaging one side of said armature; means supporting said brushes engaging one side of said armature; means supporting said brushes adjacent said one side of said armature; a cylindrical support sleeve including a radially outwardly extending plate formed integral with said support sleeve; means for mounting said first motor end plate to said last named outwardly extending plate so that a first end of said sleeve is exposed for mounting to a vehicle suspension system and the other sleeve end extends within said cylindrical motor housing; means for rotatably supporting said first shaft end within said support sleeve; an end closure means sealing said first end of said support sleeve; a first annular sealing means for sealing the other end of said support sleeve about said shaft; and a second annular sealing means for sealing the annular space between said second annular motor end plate and said shaft whereby the ends of said motor housing are enclosed to seal the internal portion of said wheel motor.

5. An axial air gap electric wheel motor comprising: a cylindrical motor housing formed of a nonmagnetic material, said housing including an inner surface having a pair of annular grooves and an outer surface having integral fins extending radially outward to radiate heat to the ambient air surrounding said housing; motor end portions including first and second annular end plates formed of a magnetic material, said first and second end plates carried in an axially spaced apart relationship by said inner surface of said housing and held in place by a pair of snap rings resiliently engaging said annular grooves; an annular field assembly including circumferentially spaced permanent magnet pole sectors providing magnetized poles of alternating polarities which produce oppositely directed magnetic fluxes, the paths of said magnetic fluxes including an air gap space between said permanent magnet pole sectors and said second end plate; a cylindrical support sleeve for mounting said wheel motor to a vehicle suspension system including means for securing the annular portion of said first end plate intermediate the ends of said support sleeve; a shaft including a rearward end journaled within said cylindrical support sleeve and an outer end extending through the annular portion of said second end plate, said outer shaft end including a driving flange for receiving and supporting a vehicle wheel; an intermediate shaft portion having an increased diameter; said intermediate shaft portion including an integral armature support flange extending radially between said first and second end plates; an annular sealing means for enclosing the outer end of said motor and extending between said second end plate and said shaft; a disc armature including plural nonconductive annular discs made of an insulating sheet material; a plurality of armature conductors secured on both sides of each of said nonconductive discs said armature conductors including connecting portions extending beyond the inner and outer boundaries of said nonconductive discs in overlapping relationship; means connecting said conductor connecting portions together at the outer boundaries and at the inner boundaries so as to form an armature circuit having a continuous wave winding pattern; means for clamping said disc armature to said armature support flange of said shaft whereby the armature circuit pattern extends into said magnetic field flux paths produced by said annular field assembly; a plurality of brush holders circumferentially spaced from each other and carried by said first annular end plate between said magnetic pole sectors, first and second groups of motor brushes included in said brush holders and engaging said armature conductors which are carried by said disc armature; conductor means for connecting said first group of brushes to a source of electrical power to apply a voltage across said first group of brushes that supplies current in said armature conductors so that torque is developed which rotates said disc armature in a predetermined direction; and means connected between said second group of brushes and the electrical source for selectively applying a voltage across said second group of brushes which is effective to oppose the torque producing effect of the voltage applied across said first group of brushes thereby opposing the rotation of said armature to decrease the speed of a vehicle wheel being driven by said motor shaft.

UNITED STATES PATENT OFFICE
CERTIFICATE OF CORRECTION

Patent No. 3,566,165      Dated February 23, 1971

Inventor(s) Thomas E. Lohr

It is certified that error appears in the above-identified patent and that said Letters Patent are hereby corrected as shown below:

On the cover sheet [56] the patent number for Beck et al should read -- 3,302,739 --; in the Abstract, line 3, cancel "airgap" and insert -- air gap --; column 6, line 33, cancel "a" and insert -- pole --; line 34, cancel "116a" and insert -- 116d --; column 9, lines 68 and 69, cancel "means supporting said brushes engaging one side of said armature;"; column 10, line 25, after "sectors" inser -- secured to said first end plate, said pole sectors --.

Signed and sealed this 19th day of December 1972.

(SEAL)
Attest:

EDWARD M. FLETCHER, JR.
Attesting Officer

ROBERT GOTTSCHALK
Commissioner of Pa